United States Patent
Enomoto

(10) Patent No.: US 6,721,107 B2
(45) Date of Patent: Apr. 13, 2004

(54) ZOOM LENS SYSTEM

(75) Inventor: Takashi Enomoto, Chiba (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/050,920

(22) Filed: Jan. 22, 2002

(65) Prior Publication Data

US 2002/0145810 A1 Oct. 10, 2002

(30) Foreign Application Priority Data

Jan. 24, 2001 (JP) ........................................ 2001-015740

(51) Int. Cl.$^7$ ............................................. G02B 15/177
(52) U.S. Cl. ...................................... 359/689; 359/682
(58) Field of Search ................................. 359/689, 683, 359/680, 681, 682

(56) References Cited

U.S. PATENT DOCUMENTS

| | | |
|---|---|---|
| 4,917,482 A | 4/1990 | Ito |
| 4,918,480 A | 4/1990 | Hori |
| 4,975,725 A | 12/1990 | Morisawa |
| 4,978,204 A | 12/1990 | Ito |
| 4,984,877 A | 1/1991 | Ito |
| 5,144,352 A | 9/1992 | Shono |
| 5,222,407 A | 6/1993 | Sekiguchi |
| 5,237,357 A | 8/1993 | Morisawa |
| 5,268,792 A | * 12/1993 | Kreitzer et al. ............. 359/676 |
| 5,270,864 A | * 12/1993 | Watanabe ................... 359/679 |
| 5,305,148 A | 4/1994 | Ikemori et al. |
| 5,313,244 A | 5/1994 | Arai |
| 5,345,338 A | * 9/1994 | Ueda et al. .................. 359/679 |
| 5,357,374 A | 10/1994 | Ohno |
| 5,572,276 A | 11/1996 | Hirakawa |
| 5,646,790 A | 7/1997 | Kohmoto et al. |
| 5,671,449 A | 9/1997 | Shimizu |
| 5,701,208 A | 12/1997 | Sato et al. |
| 5,708,533 A | 1/1998 | Hamasaki |
| 5,774,748 A | 6/1998 | Ito et al. |
| 5,842,057 A | 11/1998 | Nomura et al. |
| 6,028,714 A | 2/2000 | Koyama |

FOREIGN PATENT DOCUMENTS

| | | |
|---|---|---|
| JP | 8-146296 | 6/1996 |
| JP | 2000193886 | 7/2000 |
| JP | 2000275518 | 10/2000 |
| JP | 2001235680 | 8/2001 |
| JP | 2001337274 | 12/2001 |

* cited by examiner

Primary Examiner—Scott J. Sugarman
Assistant Examiner—Deborah A. Ralzen
(74) Attorney, Agent, or Firm—Greenblum & Bernstein, P.L.C.

(57) ABSTRACT

A zoom lens system includes a negative first lens group, a positive second lens group, and a negative third lens group. Zooming is performed by moving the first through third lens groups in the optical axis direction. The negative first lens group is constituted by a negative single lens element having a concave surface facing toward the object, and satisfies the following condition:

$$-1 < r1/fW < 0 \qquad (1)$$

wherein r1 designates the radius of curvature of the object-side concave surface of said negative single lens element; and fW designates the focal length of the entire zoom lens system at the short focal length extremity.

29 Claims, 11 Drawing Sheets

Fig. 1
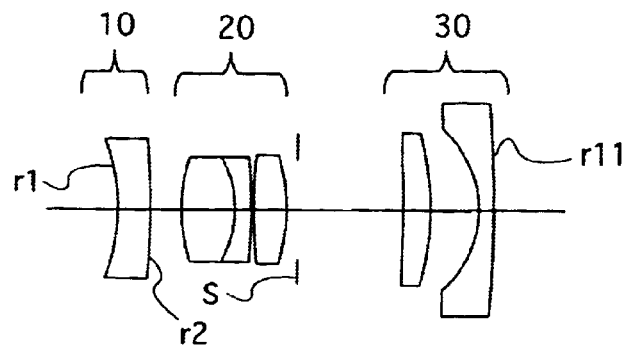
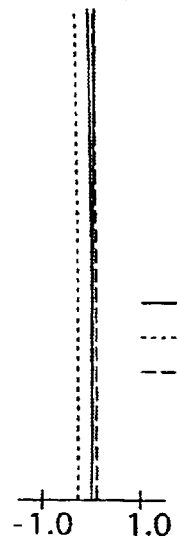
Fig.2A
F 5.6
— d Line
······ g Line
---- C Line
-1.0  1.0
SPHERICAL
ABERRATION
CHROMATIC
ABERRATION
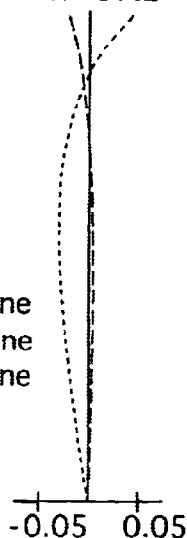
Fig.2B
W=37.2°
-0.05  0.05
LATERAL
CHROMATIC
ABERRATION
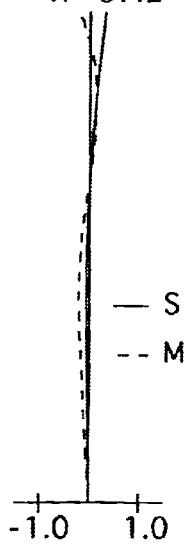
Fig.2C
W=37.2°
— S
-- M
-1.0  1.0
ASTIGMATISM
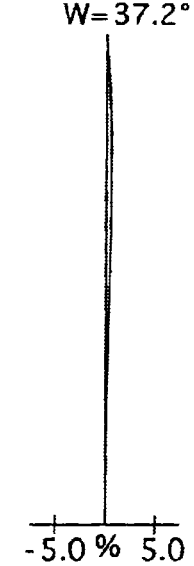
Fig.2D
W=37.2°
-5.0 %  5.0
DISTORTION Fig. 3
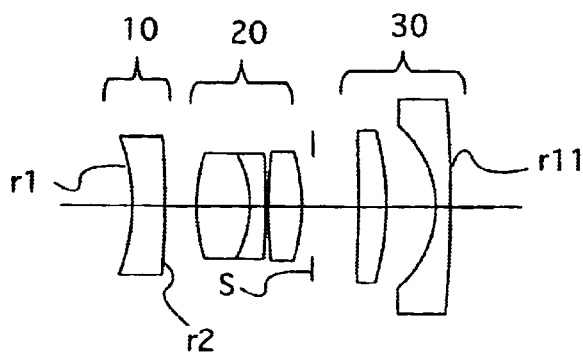
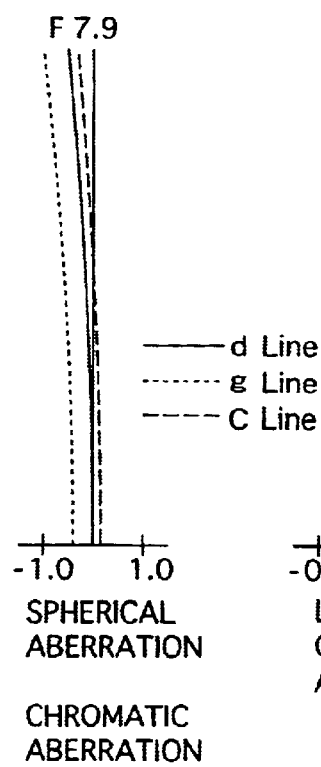
Fig.4A
F 7.9
—— d Line
······· g Line
---- C Line
-1.0  1.0
SPHERICAL
ABERRATION
CHROMATIC
ABERRATION
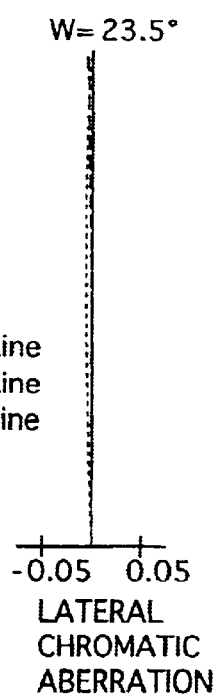
Fig.4B
W= 23.5°
-0.05  0.05
LATERAL
CHROMATIC
ABERRATION
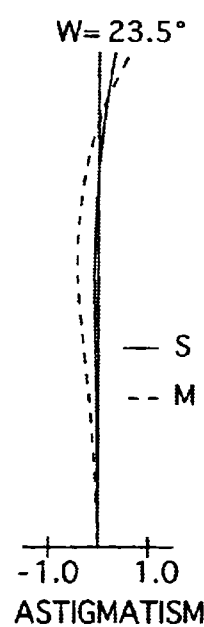
Fig.4C
W= 23.5°
— S
-- M
-1.0  1.0
ASTIGMATISM
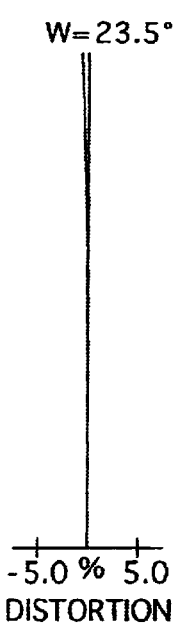
Fig.4D
W= 23.5°
-5.0 % 5.0
DISTORTION

F 7.7
SPHERICAL ABERRATION
CHROMATIC ABERRATION

W=16.9°
LATERAL CHROMATIC ABERRATION

W=16.9°
ASTIGMATISM

W=16.9°
DISTORTION

Fig. 7
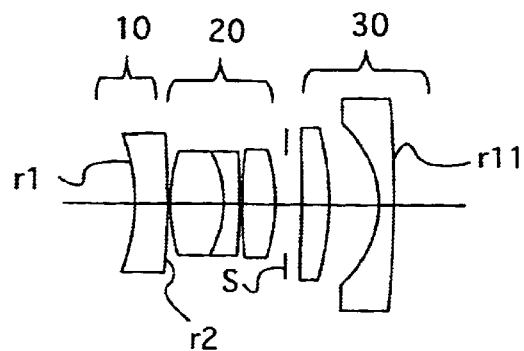
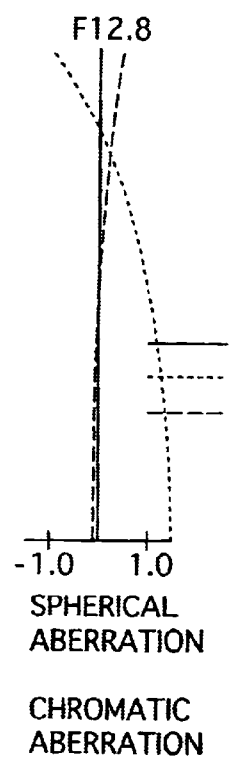
Fig.8A
F12.8
—— d Line
----- g Line
---·--- C Line
SPHERICAL
ABERRATION
CHROMATIC
ABERRATION
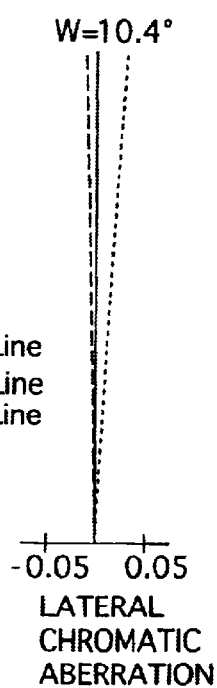
Fig.8B
W=10.4°
LATERAL
CHROMATIC
ABERRATION
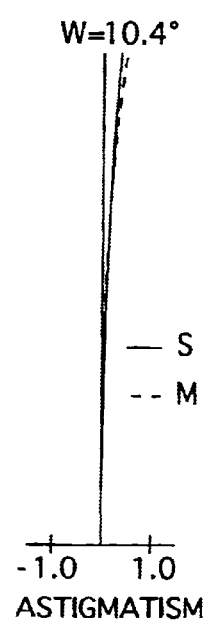
Fig.8C
W=10.4°
—— S
-- M
ASTIGMATISM
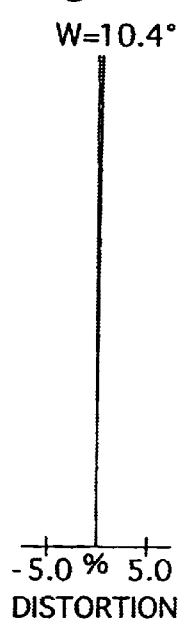
Fig.8D
W=10.4°
DISTORTION Fig. 9
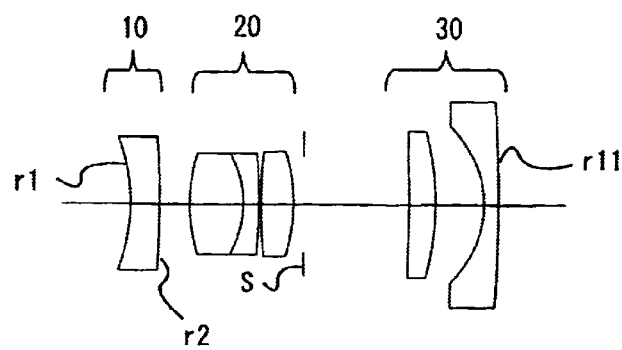
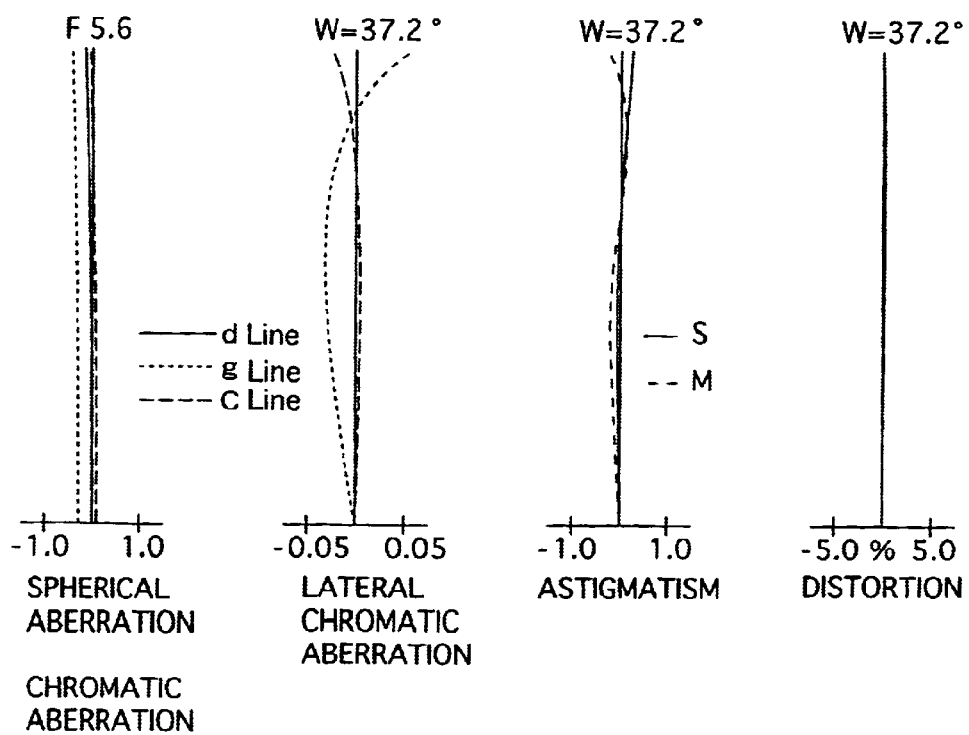
Fig.10A Spherical Aberration Chromatic Aberration
Fig.10B Lateral Chromatic Aberration
Fig.10C Astigmatism
Fig.10D Distortion

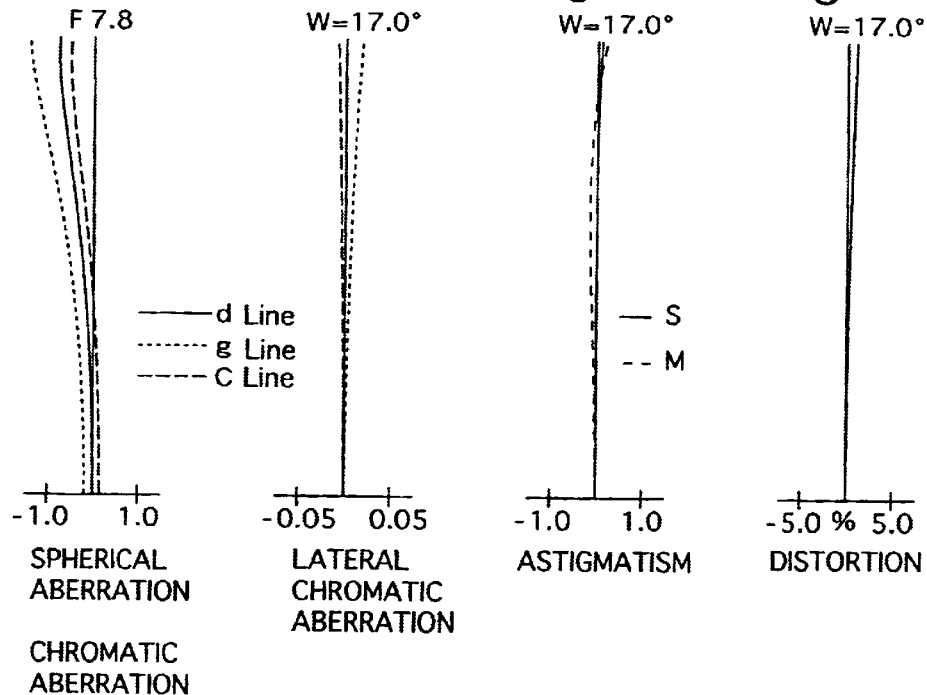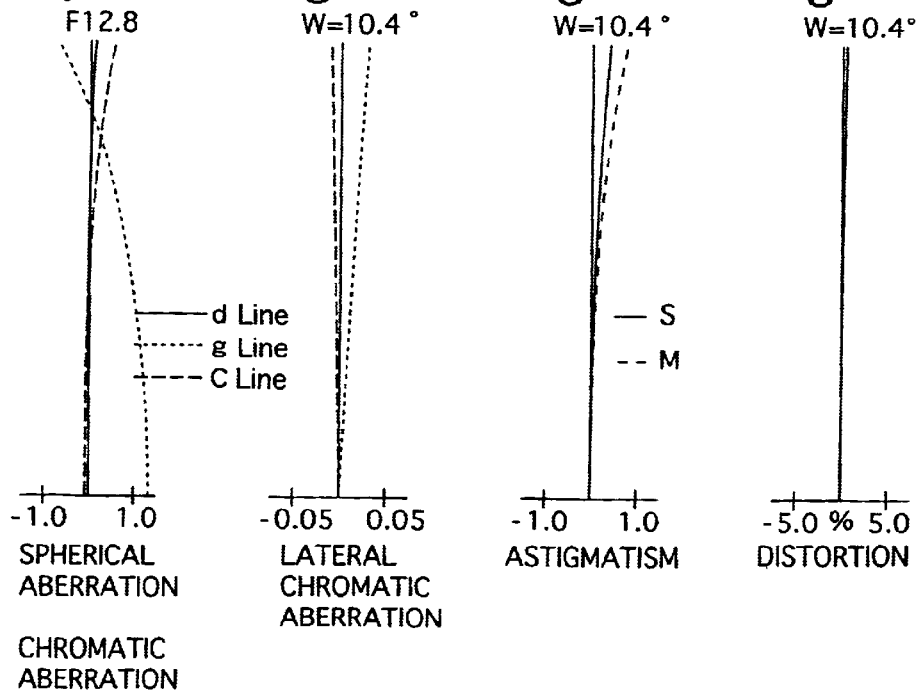

Fig. 13
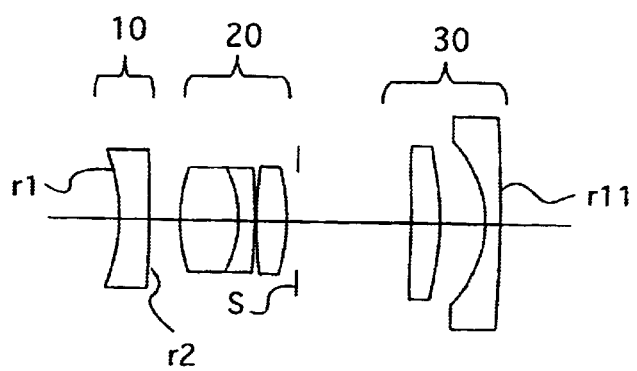
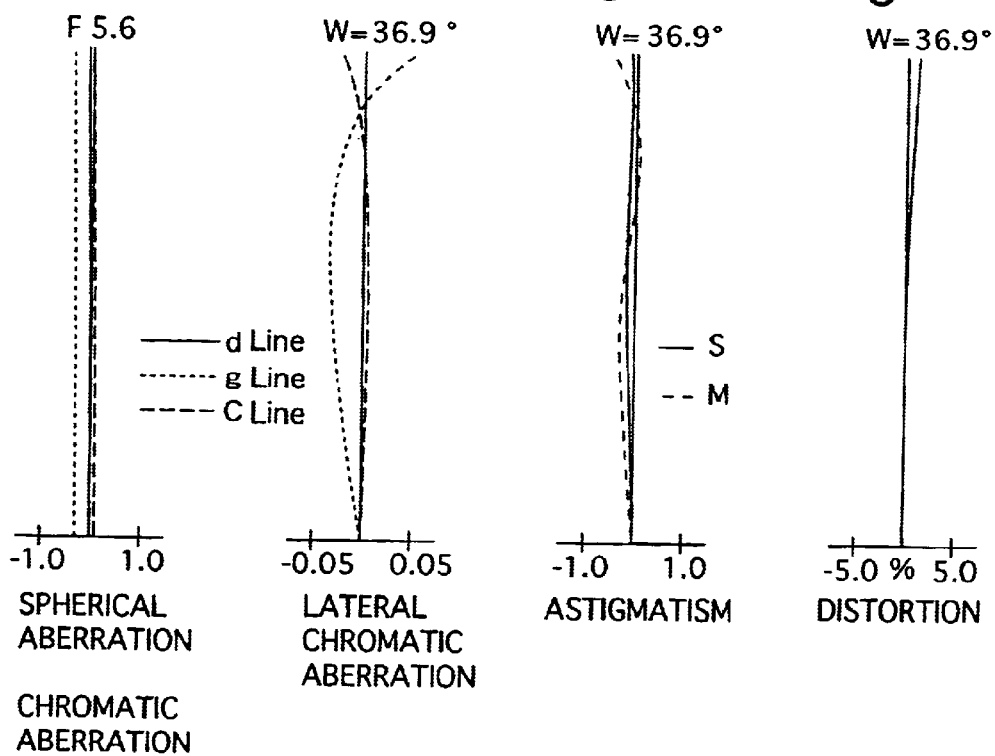
Fig.14A  Fig.14B  Fig.14C  Fig.14D

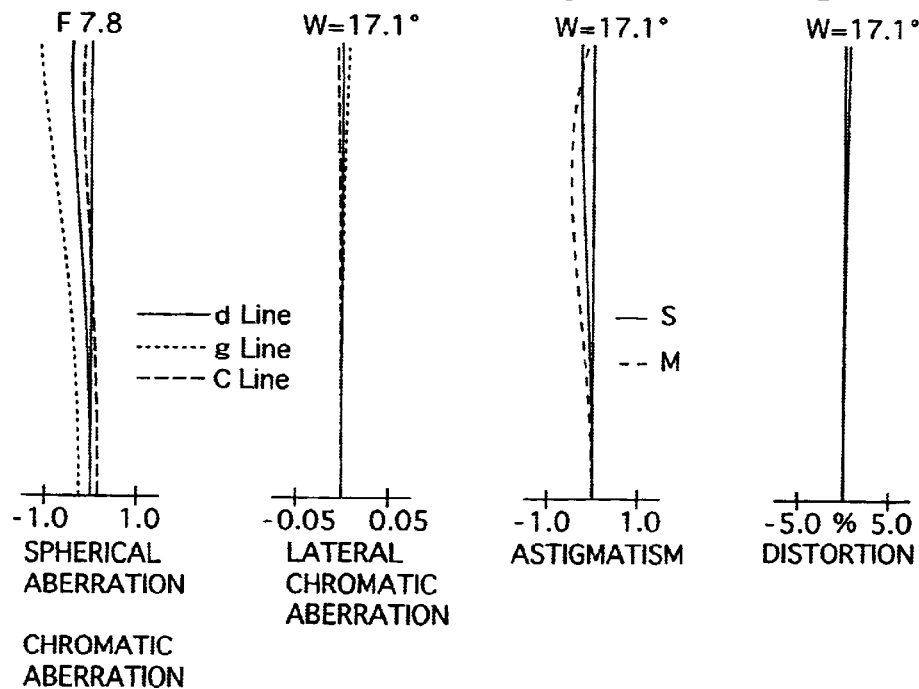
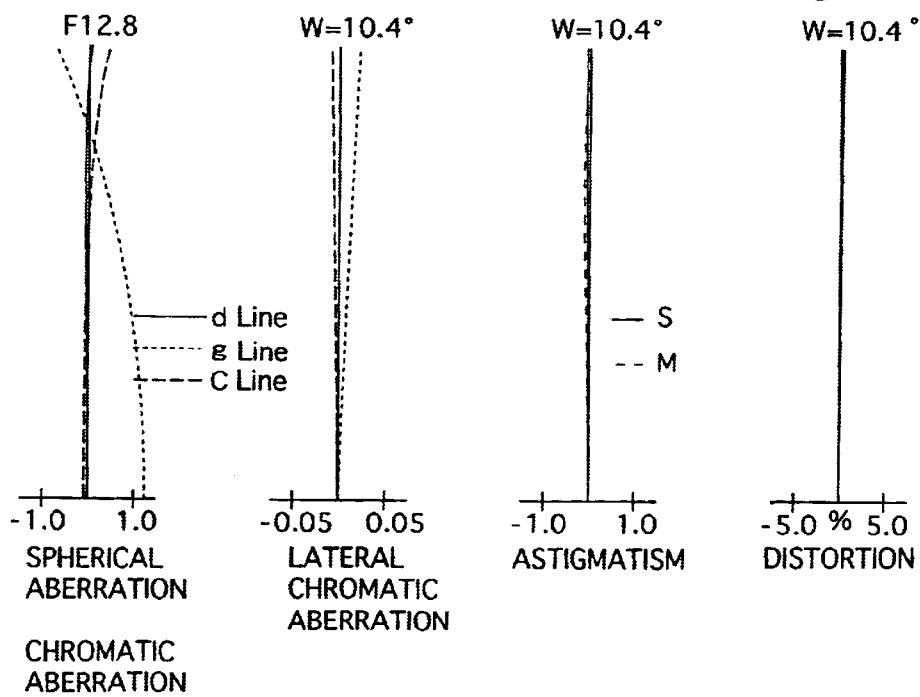

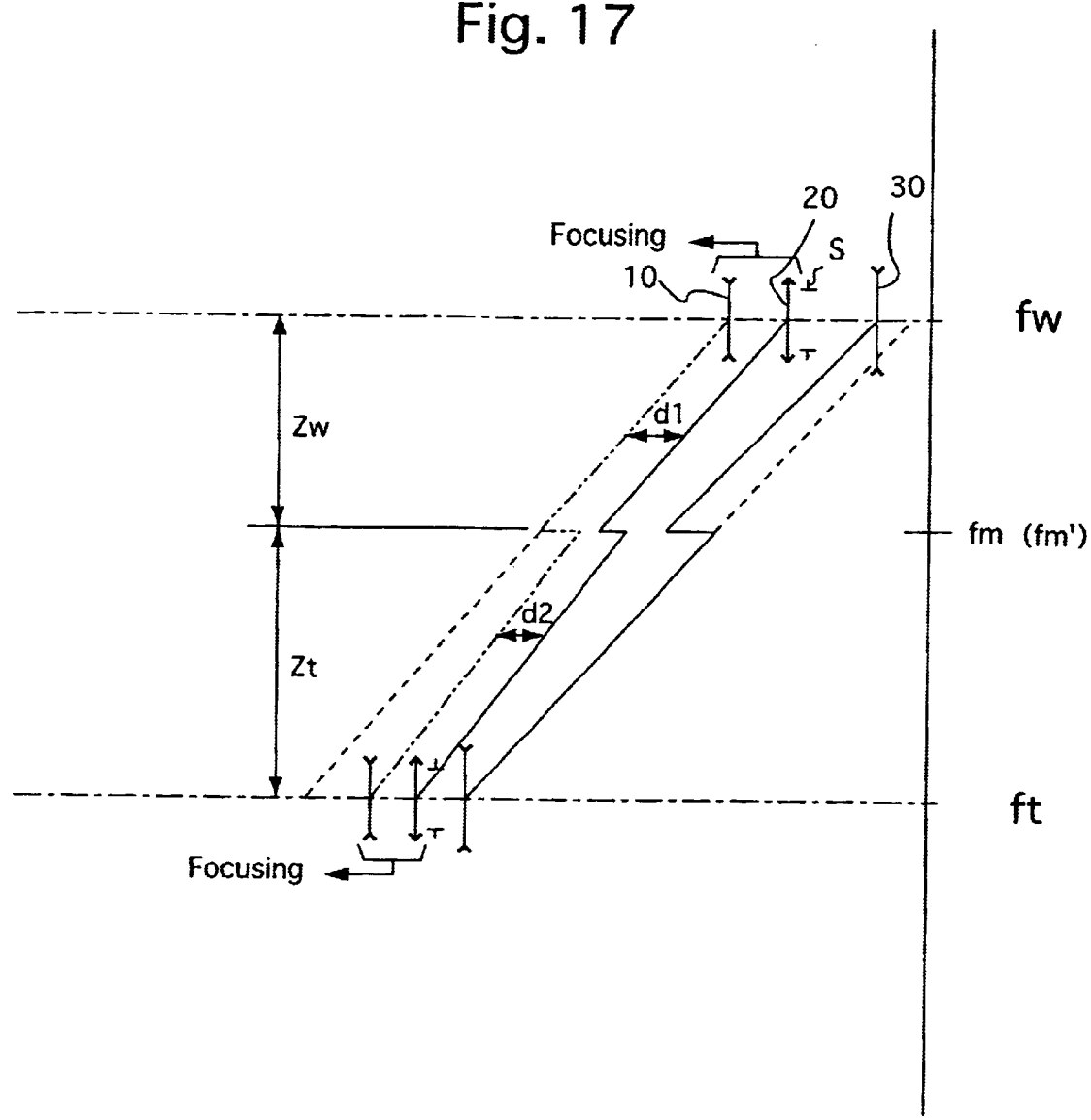

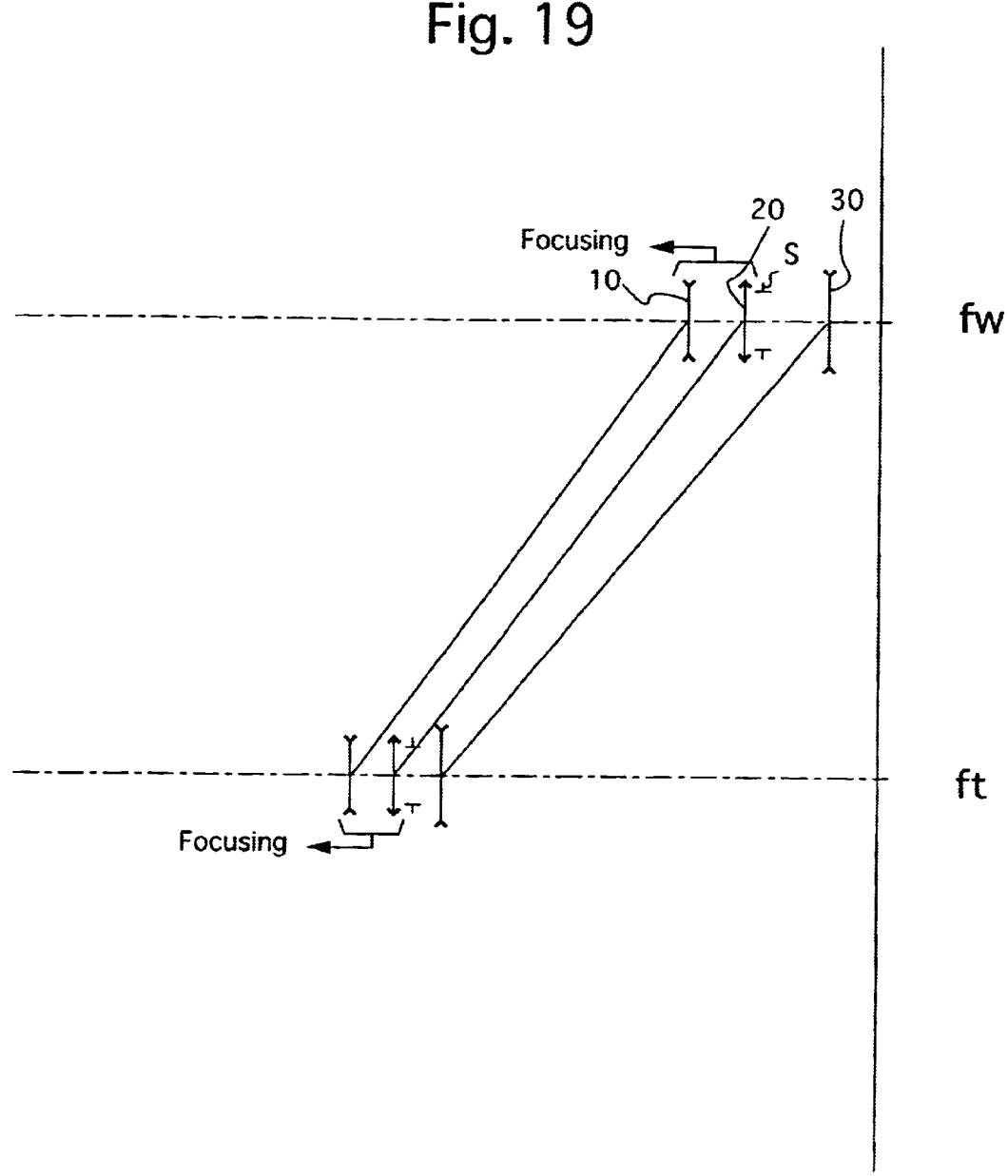

ZOOM LENS SYSTEM

BACKGROUND OF THE INVENTION

1. Field of the Invention

The present invention relates to a three-lens-group zoom lens system for a compact camera, and in particular relates to making the angle-of-view at the short focal length extremity larger.

2. Description of the Prior Art

A zoom lens system of a compact camera does not require a long back focal distance unlike a zoom lens system of a single lens reflex camera in which a space for a quick-return mirror is required behind the photographing lens system. Accordingly, a compact camera has employed a telephoto lens system including a positive powered (herein after, positive) lens group and a negative powered (hereinafter, negative) lens group, in this order from the object. On the other hand, a single lens reflex camera has employed a retrofocus lens system including a negative lens group and a positive lens group, in this order from the object.

In a conventional telephoto zoom lens system of a compact camera, the half angle-of-view at the short focal length extremity is at most about 30°. Moreover, a three-lens-group zoom lens system which can attain the half angle-of-view of more than 35° at the short focal length extremity has not been known.

SUMMARY OF THE INVENTION

An object of the present invention is to provide a miniaturized three-lens-group zoom lens system for a compact camera in which the half angle-of-view of more than 35° at the short focal length extremity can be attained.

In order to achieve the above-mentioned object, there is provided a zoom lens system including a negative first lens group, a positive second lens group, and a negative third lens group, in this order from the object. Zooming is performed by moving the first through third lens groups in the optical axis direction. The negative first lens group is constituted by a negative single lens element having a concave surface facing toward the object, and satisfies the following condition:

$$-1 < r1/fW < -0.3 \quad (1)$$

wherein
r1 designates the radius of curvature of the object-side concave surface of said negative single lens element; and
fW designates the focal length of the entire zoom lens system at the short focal length extremity.

The negative single lens element having the concave surface facing toward the object can be constituted by a negative meniscus lens element.

The zoom lens system of the present invention preferably satisfies the following condition:

$$50 < vd \quad (2)$$

wherein
vd designates the Abbe number of the negative single lens element.

The zoom lens system of the present invention can satisfy the following condition:

$$1.7 < nd \quad (3)$$

wherein
nd designates the refractive index of the d-line of the negative single lens element.

The zoom lens system of the present invention preferably satisfies the following condition:

$$-5 < fT/f1G < -3 \quad (4)$$

wherein
fT designates the focal length of the entire zoom lens system at the long focal length extremity; and
f1G designates the focal length of the negative single lens element.

The zoom lens system of the present invention preferably satisfies the following condition:

$$0.05 < (d12W - d12T)/fW < 0.15 \quad (5)$$

wherein
d12W designates the distance between the negative single lens element and the second lens group at the short focal length extremity; and
d12T designates the distance between the negative single lens element and the second lens group at the long focal length extremity.

The zoom lens system of the present invention can satisfy the following condition:

$$0.6 < y/fw < 0.9 \quad (6)$$

wherein
y designates the diagonal image height on a film surface.

The zoom lens system of the present invention can satisfy the following condition:

$$3.5 < fT/fW \quad (7)$$

wherein
fT designates the focal length of the entire zoom lens system at the long focal length extremity; and
fW designates the focal length of the entire zoom lens system at the short focal length extremity.

The positive second lens group includes a lens element having at least one aspherical surface, and can satisfy the following condition:

$$-30 < \Delta IASP < -10 \quad (8)$$

wherein
$\Delta IASP$ designates the amount of change of the spherical aberration coefficient due to the aspherical surface under the condition that the focal length at the short focal length extremity is converted to 1.0.

The negative third lens group includes a lens element having at least one aspherical surface, and can satisfy the following condition:

$$0 < \Delta VASP < 0.4 \quad (9)$$

wherein
$\Delta VASP$ designates the amount of change of the distortion coefficient due to the aspherical surface under the condition that the focal length at the short focal length extremity is converted to 1.0.

The present disclosure relates to subject matter contained in Japanese Patent Application No.2001-015740 (filed on Jan. 24, 2001) which is expressly incorporated herein in its entirety.

BRIEF DESCRIPTION OF THE DRAWINGS

The invention will be discussed below in detail with reference to the accompanying drawings, in which:

FIG. 1 is a lens arrangement of a zoom lens system according to a first embodiment of the present invention, at the short focal length extremity;

FIGS. 2A, 2B, 2C and 2D show aberrations occurred in the lens arrangement shown in FIG. 1;

FIG. 3 is a lens arrangement of the zoom lens system according to the first embodiment of the present invention, at an intermediate focal length in a short-focal-length side zooming range Zw.

FIGS. 4A, 4B, 4C and 4D show aberrations occurred in the lens arrangement shown in FIG. 3;

FIG. 7 is a lens arrangement of the zoom lens system according to the first embodiment of the present invention, at the long focal length extremity;

FIGS. 8A, 8B, 8C and 8D show aberrations occurred in the lens arrangement shown in FIG. 7;

FIG. 9 is a lens arrangement of a zoom lens system according to a second embodiment of the present invention;

FIGS. 10A, 10B, 10C and 10D show aberrations occurred in the lens arrangement shown in FIG. 9, at the short focal length extremity;

FIG. 11A, 11B, 11C and 11D show aberrations occurred in the lens arrangement shown in FIG. 9, at an intermediate focal length;

FIGS. 12A, 12B, 12C and 12D show aberrations occurred in the lens arrangement shown in FIG. 9, at the long focal length extremity;

FIG. 13 is a lens arrangement of a zoom lens system according to a third embodiment of the present invention;

FIGS. 14A, 14B, 14C and 14D show aberrations occurred in the lens arrangement shown in FIG. 13, at the short focal length extremity;

FIG. 15A, 15B, 15C and 15D show aberrations occurred in the lens arrangement shown in FIG. 13, at an intermediate focal length;

FIGS. 16A, 16B, 16C and 16D show aberrations occurred in the lens arrangement shown in FIG. 13, at the long focal length extremity;

FIG. 17 is a schematic lens-group moving paths of the zoom lens system according to the first embodiment of the present invention;

FIG. 19 is a schematic lens-group moving paths of the zoom lens system according to the second and third embodiments of the present invention.

DESCRIPTION OF THE PREFERRED EMBODIMENTS

Figure 18:
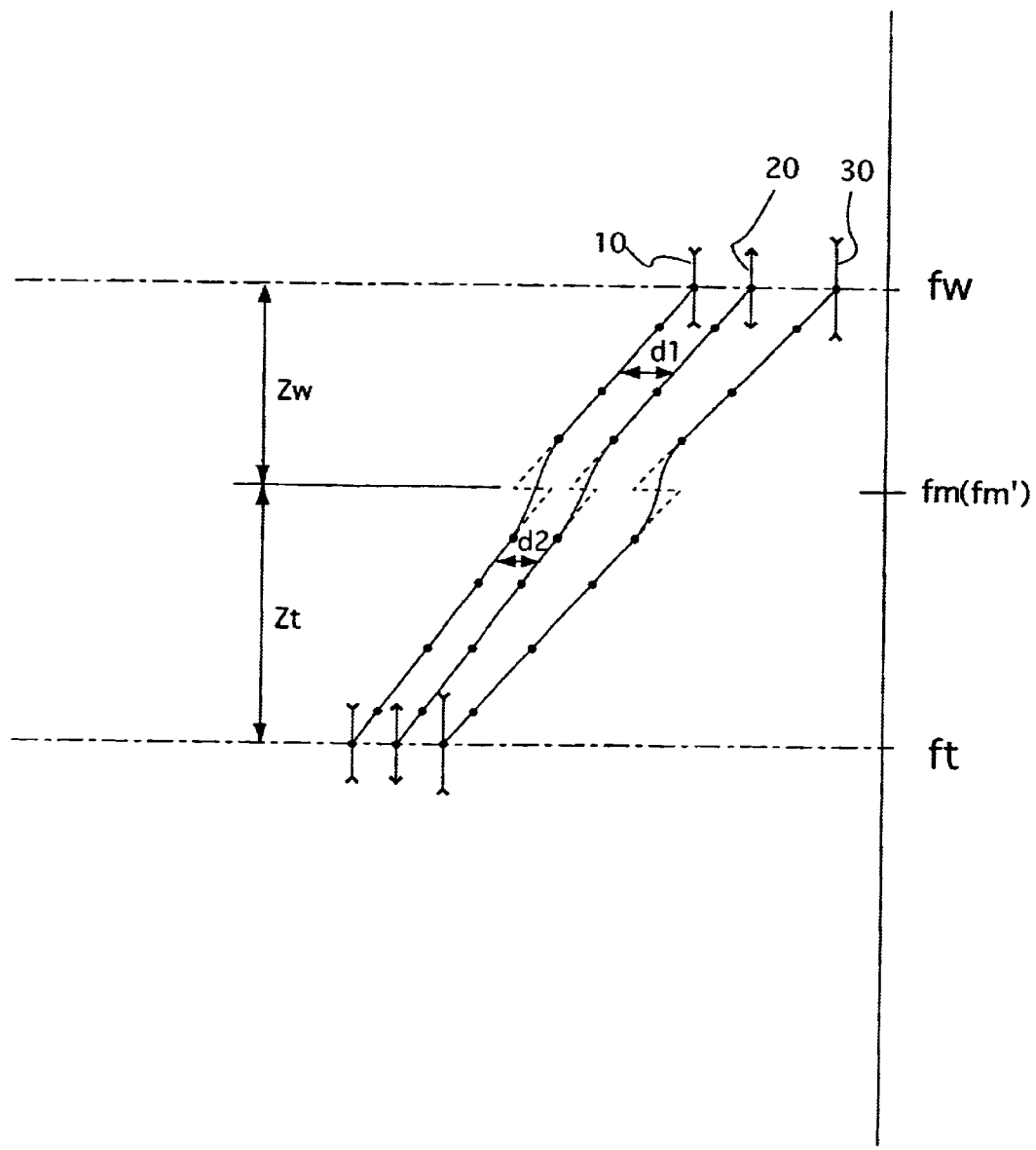
FIG. 18 is another schematic lens-group moving paths of the zoom lens system according to the first embodiment of the present invention.

The three-lens-group zoom lens system according to the present invention can be applied to a zoom lens system which (i) is constituted by, as shown in FIGS. 17, 18 and 19, a negative first lens group 10, a positive second lens group 20, and a negative third lens group 30, in this order from the object, and (ii) performs zooming by moving the first through third lens groups along the optical axis direction.

In the above schematic lens-group moving paths of FIGS. 17 to 19, FIG. 17 shows the ones which are discontinued (switched) at an intermediate focal length fm. Upon zooming from the short focal length extremity fw toward the long focal length extremity ft, the negative first lens group 10, the positive second lens group 20, and the negative third lens group 30 move as follows:

[1] In a focal length range (the first focal length range; the short-focal-length side zooming range) Zw defined by the short focal length extremity fw and the intermediate focal length fm, the negative first lens group 10, the positive second lens group 20, and the negative third lens group 30 move toward the object; and the first lens group 10 and the second lens group 20 maintain a distance d1 therebetween (the first state);

[2] At the intermediate focal length fm, the first to third lens groups 10 to 30 move toward the image by a predetermined distance, thereby the intermediate focal length fin is changed to a switched intermediate focal length fm'; and the distance d1 between the first lens group 10 and the second lens group 20 is made shorter to form a shorter distance d2 (the second state);

[3] In a focal length range (the second focal length range; the long-focal-length side zooming range) Zt defined by the switched intermediate focal length fm' and the long focal length extremity ft, the first to third lens groups 10 to 30 move toward the object; and the first lens group 10 and the second lens group 20 maintain the distance d2 (the second state).

It should be noted that the intermediate focal length fin belongs to the first focal length range Zw; and the switched intermediate focal length fm' is defined as a focal length which is obtained under the condition that (i) the first lens group 10 and the third lens group 30 move toward the image, and (ii) the distance between the first lens group 10 and the second lens group 20 are made shorter to form the distance d2.

A diaphragm S moves together with the second lens group 20 upon zooming.

The lens-group moving paths for the first lens group 10, the second lens group 20, and the third lens group 30 are schematically depicted as straight lines in FIG. 17. However, actual lens-group moving paths are not always straight lines.

Focusing is performed by integrally moving the first lens group 10 and the second lens group 20, regardless of the focal length ranges.

The lens-group moving paths shown in FIG. 17 are discontinued at the intermediate focal length fin and the switched intermediate focal length fm'; however, by adequately determining the positions of the first lens group 10, the second lens group 20 and the third lens group 30 respectively at the short focal length extremity fw, the intermediate focal length fm, and the switched intermediate focal length fm', and the long focal length extremity ft, solutions by which an image is correctly formed can be obtained. According to the lens-group moving paths with such solutions, a zoom lens system which is miniaturized and has a high zoom ratio can be obtained.

In FIG. 18, black dots indicate positions at which each lens group is to be stopped, in the case that these stopping positions are determined in a stepwise manner along the lens-group moving paths in FIG. 17. Furthermore, in FIG. 18, the dots are connected by smooth curved lines. According to an actual mechanical structure, each lens group can be moved along such smooth curved lines.

FIG. 19 is a schematic lens-group moving paths in the case that no switched intermediate focal length is provided. Upon zooming from the short focal length extremity fw toward the long focal length extremity ft, all the lens groups 10 to 30 move toward the object while the distances thereamong are varied. The diaphragm S is provided between the second lens group 20 and the third lens group 30, and moves together with the second lens group 20 upon zooming.

A feature of the embodiments is that the negative first lens group 10 is constituted by a negative single lens element (preferably, a negative meniscus lens element) having a concave surface facing toward the object (lens surface No.1), under the condition that the first lens group 10 is one of the three lens groups constituting a zoom lens system in which each lens group can move along the lens-group moving paths shown in FIGS. 17 to 19. Specifically, in a wide-angle zoom lens system including three lens groups with the half angle-of-view of more than 35° at the short focal length extremity, if the number of lens elements constituting the first lens group 10 and the thickness thereof are larger, the diameter of the first lens group 10 and that of the second lens group 20 are prone to be increased in order to collect peripheral illumination. However, an increase of the diameter of a lens group makes the height of a camera larger, so that miniaturization the camera becomes difficult. By constituting the first lens group 10 as the negative single lens element (preferably, a negative meniscus lens element) having the concave surface facing toward the object (lens surface No.1), an increase of the diameter of the first lens group 10, i.e., the most front lens group, can be prevented, while peripheral illumination can be secured. Furthermore, the above-explained three-lens-group zoom lens system can be applied to a lens system having the half angle-of-view of less than 30° at the short focal length extremity.

Condition (1) specifies the negative single lens element in order to reduce the thickness of the negative first lens group 10 under the condition that the negative first lens group 10 is constituted by the negative single lens element (preferably, a negative meniscus lens element) having the concave surface facing toward the object (lens surface No.1). By satisfying condition (1), peripheral illumination can be secured at the short focal length extremity having a large angle-of-view, and an increase of the diameter of the first lens group 10, i.e., the most front lens group, can be prevented.

If r1/fW exceeds the upper limit of condition (1), the radius of curvature of the first surface becomes too small, so that manufacture of the negative single lens element becomes impossible, or the requirement to form the first surface (lens surface No.1) as the concave surface is not satisfied, so that peripheral illumination cannot be secured.

If r1/fW exceeds the lower limit of condition (1), the effect of divergence of the first surface (lens surface No. 1) is small, and the diameter of the first lens group 10, i.e., the most front lens group, increases in order to secure peripheral illumination.

Condition (2) specifies the Abbe number for correcting chromatic aberration in all the zooming ranges, since the first lens group 10 is constituted by the negative single lens element.

If condition (2) is not satisfied, the correcting of chromatic aberration by the negative single lens element become difficult in all the zooming ranges.

Condition (3) specifies the refractive index of the negative single lens element constituting the first lens group 10. If the radius of curvature of the first surface (lens surface No.1) of the negative single lens element becomes too small, aberrations occurred in the negative single lens element itself are noticeable, so that fluctuations of aberrations due to zooming become larger. Furthermore, manufacture of the negative single lens element becomes difficult.

If condition (3) is not satisfied, aberrations occurred in the negative single lens element becomes noticeable, so that fluctuations of aberrations due to zooming become larger. This is because the radius of curvature of the first surface (lens surface No.1) of the negative single lens element has to be made smaller in order to maintain the refractive power with a smaller refractive index.

Condition (4) specifies the traveling distance of the first lens group 10 (the negative single lens element). If an attempt is made to miniaturize a camera under the condition that the angle-of-view at the short focal length extremity is made larger, and further, a zoom ratio of more than 4 is attained, there is a need to reduce the traveling distance of the first lens group 10.

If fT/f1G exceeds the upper limit of condition (4), the traveling distance of the negative single lens element becomes longer, so that miniaturization of a camera cannot be attained.

If fT/f1G exceeds the lower limit of condition (4), the power of the negative single lens element becomes too strong, so that aberrations in the negative single lens element become larger, and fluctuations of aberrations upon zooming become larger.

Condition (5) is for reducing the diameters of the first lens group 10 and the second lens group 20. If the distance between the first lens group 10 and the second lens group 20 become longer due to an increase of the traveling distances thereof in order to attain a zoom ratio of more than 4, the diameters of the first lens group 10 and the second lens group 20 are prone to increase in order to secure peripheral illumination, specifically at the short focal length extremity.

If (d12W−d12T)/fW exceeds the upper limit of condition (5), the distance between the first lens group 10 and the second lens group 20 becomes longer, so that miniaturization of a camera cannot be attained.

If (d12W−d12T)/fW exceeds the lower limit of condition (5), the effect of zooming of the first lens group 10 and that of the second lens group 20 become smaller, so that a higher zoom ratio cannot be attained.

Condition (6) is for making the angle-of-view at the short focal length extremity larger, i.e., for making the focal length at the short focal length extremity shorter.

If y/fW exceeds the upper limit of condition (6), the angle-of-view at the short focal length extremity cannot be made larger.

Condition (7) is for attaining a zoom ratio of more than 4.

If fT/fW exceeds the upper limit of condition (7), a zoom ratio of more than 4 cannot be attained.

Condition (8) specifies an aspherical surface in the positive second lens group 20 in the case that the positive second lens group 20 includes a lens element having at least one aspherical surface. By providing, in the positive second lens group 20, a lens element having at least one aspherical surface, the number of lens elements thereof can be reduced, and spherical aberration, in particular, at the short focal length extremity, can be corrected.

If ΔIASP exceeds the upper limit of condition (8), the effect of the correcting of spherical aberration by the aspherical surface is smaller, so that the correcting thereof cannot be made sufficiently.

If ΔIASP exceeds the lower limit of condition (8), the amount of asphericity is larger, so that manufacture of the lens element having the aspherical surface becomes difficult.

Condition (9) specifies an aspherical surface in the negative third lens group 30 in the case that the negative third lens group 30 includes a lens element having at least one aspherical surface. By providing, in the negative third lens group 30, a lens element having at least one aspherical surface, the number of lens elements thereof can be reduced, and distortion, in particular, at the short focal length extremity, can be corrected.

If ΔVASP exceeds the upper limit of condition (9), the amount of asphericity becomes larger, so that manufacture of the lens element having the aspherical surface becomes difficult.

If ΔVASP exceeds the lower limit of condition (9), the effect of the correcting of distortion by the aspherical surface is smaller, so that the correcting thereof cannot be made sufficiently.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FNO designates the F-number, f designates the focal length of the entire zoom lens system, W designates the half angle-of-view (°), $f_B$ designates the back focal distance (the equivalent air thickness from the most object-side surface to the image-forming plane), r designates the radius of curvature, d designates the lens-element thickness or distance between lens elements, Nd designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10} \ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

The relation between the aspherical coefficients and the aberration coefficients will be herein discussed.

1. The shape of an aspherical surface is defined as follows:

$$x = cy^2/(1+[1-\{1+K\}c^2y^2]^{1/2}) + A4y^4 + A6y^6 + A8y^8 + A10y^{10} \ldots$$

wherein:

x designates a distance from a tangent plane of an aspherical vertex;

y designates a distance from the optical axis;

c designates a curvature of the aspherical vertex (1/r),

K designates a conic constant;

2. In this equation, to obtain the aberration coefficients, the following substitution is made to replace K with "0" (Bi=Ai when K=0).

B4=A4+Kc³/8;

B6=A6+(K²+2K)c⁵/16;

B8=A8+5(K³+3K²+3K)c⁷/128

B10=A10+7(K⁴+4K³+6K²+4K)c⁹/256; and therefore, the following equation is obtained:

$$x = cy^2/[1+[1-c^2y^2]^{1/2}] + B4y^4 + B6y^6 + B8y^8 + B10y^{10} \ldots$$

3. Furthermore, in order to normalize the focal length f to 1.0, the followings are considered:

X=x/f; Y=y/f; C=f*c;

α4=f³B4; α6=f⁵B6; α8=f⁷B8; α10=f⁹B10

Accordingly, the following equation is obtained.

$$X = CY^2/[1+[1-C^2Y^2]^{1/2}] + \alpha 4 Y^4 + \alpha 6 Y^6 + \alpha 8 Y^8 + \alpha 10 Y^{10} + \ldots$$

4. Φ=8(N'−N)α4 is defined, and the third aberration coefficients are defined as follows:

I designates the spherical aberration coefficient;

II designates the coma coefficient;

III designates the astigmatism coefficient;

IV designates the curvature coefficient of the sagittal image surface; and

V designates a distortion coefficient; and therefore, the influence of the fourth-order aspherical-surface coefficient (α4) on each aberration coefficient is defined as:

ΔI=h⁴Φ

ΔII=h³kΦ

ΔIII=h²k²Φ

ΔIV=h²k²Φ

ΔV=hk³Φ wherein h1 designates the height at which a paraxial axial light ray strikes the first surface of the lens system including the aspherical surface;

h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

Embodiment 1

Figures 5, 6D:
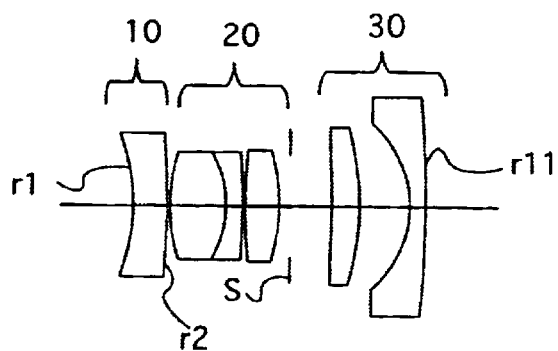
FIG. 5 is another lens arrangement of the zoom lens system according to the first embodiment of the present invention, at an intermediate focal length in a long-focal-length side zooming range Zt.
FIGS. 6A, 6B, 6C and 6D show aberrations occurred in the lens arrangement shown in FIG. 5.
Figure 6A:
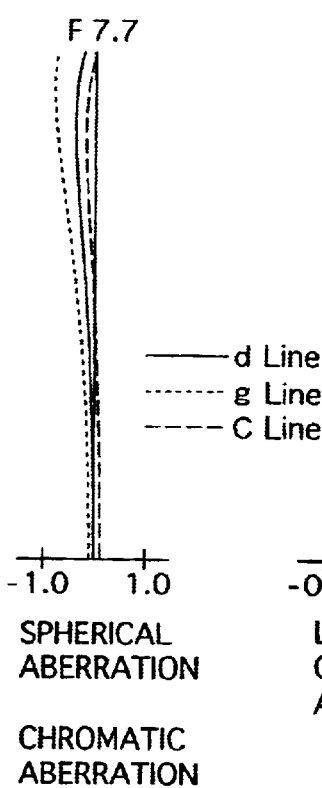
Figure 6B:
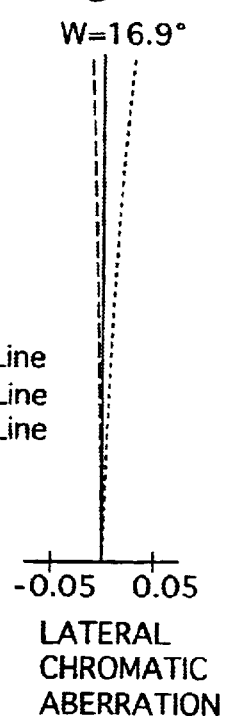
Figure 6C:
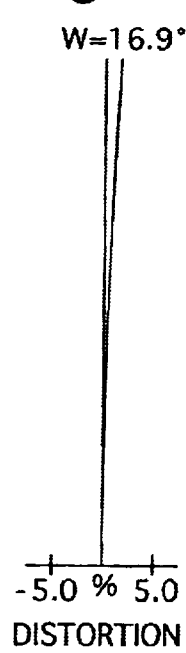

FIGS. 1 through 8D show the first embodiment of the present invention. The first embodiment is applied to a zoom lens system having the lens-group moving paths shown in FIG. 17 or FIG. 18. FIG. 1 is the lens arrangement of the zoom lens system, at the short focal length extremity. FIG. 3 is the lens arrangement of the zoom lens system at an intermediate focal length (f=50.0) in the short-focal-length side zooming range Zw. FIG. 5 is the lens arrangement of the zoom lens system at an intermediate focal length (f=70.0) in the long-focal-length side zooming range Zt. FIG. 7 is the lens arrangement of the zoom lens system at the long focal length extremity. FIGS. 2A through 2D show aberrations occurred in the lens arrangement shown in FIG. 1. FIGS. 4A through 4D show aberrations occurred in the lens arrangement shown in FIG. 3. FIGS. 6A through 6D show aberrations occurred in the lens arrangement shown in FIG. 5.

FIGS. 8A through 8D show aberrations occurred in the lens arrangement shown in FIG. 7. Table 1 shows the numerical data of the first embodiment. The numerical data in Tables 1, 2 and 3 indicate the value f (105.00) at which a zoom ratio becomes about 3.5 with respect to the focal length at the short focal length extremity, and also indicate the corresponding values of $F_{NO}$, W, $f_B$ and d to the focal length of 105.00. Lens surface Nos. 1 and 2 define the negative first lens group 10, lens surface Nos. 3 through 7 define the positive second lens group 20, and lens surface Nos. 8 through 11 define the negative third lens group 30. The second lens group 20 includes cemented lens elements constituted by a positive lens element and a negative lens element, and a positive lens element, in this order from the object. The third lens group 30 includes a positive lens element and a negative lens element, in this order from the object side. A diaphragm S is provided 1.0 millimeter behind the second lens group 20 (lens surface No.7).

TABLE 1

$F_{NO}$ = 1:5.6–7.9–7.7–11.1–12.8
f = 28.50–50.00–70.00–105.00–118.00
W = 37.2–23.5–16.9–11.6–10.4
$f_B$ = 8.00–27.99–39.89–69.10–79.92

| Surf.No. | r | d | $N_d$ | ν |
|---|---|---|---|---|
| 1 | −17.856 | 3.05 | 1.72916 | 54.7 |
| 2 | −81.174 | 2.95–2.95–0.30–0.30–0.30 | — | — |
| 3 | 16.690 | 5.02 | 1.48749 | 70.2 |
| 4 | −10.275 | 1.50 | 1.80100 | 35.0 |
| 5 | −68.124 | 0.25 | — | — |
| 6 | 51.374 | 3.10 | 1.72750 | 40.3 |
| 7* | −16.848 | 10.97–5.27–4.90–2.90–2.45 | — | — |
| 8* | −79.908 | 2.57 | 1.58547 | 29.9 |
| 9 | −25.802 | 4.59 | — | — |
| 10 | −9.951 | 1.40 | 1.80400 | 46.6 |
| 11 | −114.020 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 7 | 0.00 | 0.7183 × 10$^{-4}$ | −0.2000 × 10$^{-6}$ | 0.2500 × 10$^{-8}$ |
| 8 | 0.00 | 0.7150 × 10$^{-4}$ | −0.2441 × 10$^{-6}$ | 0.9119 × 10$^{-8}$ |

Embodiment 2

FIGS. 9 through 12D show the second embodiment of the present invention. The second embodiment is applied to a zoom lens system having the lens-group moving paths shown in FIG. 19. FIG. 9 is the lens arrangement of the zoom lens system at the short focal length extremity. FIGS. 10A through 10D show aberrations occurred in the lens arrangement shown in FIG. 9. FIGS. 11A through 11D show aberrations occurred in the lens arrangement shown in FIG. 9, at an intermediate focal length. FIGS. 12A through 12D show aberrations occurred in the lens arrangement shown in FIG. 9, at the long focal length extremity. Table 2 shows the numerical data of the second embodiment. The basic lens arrangement of the second embodiment is the same as the first embodiment. The diaphragm S is provided 1.0 millimeter behind the second lens group 20 (lens surface No. 7).

TABLE 2

$F_{NO}$ = 1:5.6–7.8–7.7–11.2–12.8
f = 28.50–70.00–105.00–118.00
W = 37.2–17.0–11.6–10.4
$f_B$ = 8.00–42.00–70.26–80.62

| Surf.No. | r | d | $N_d$ | ν |
|---|---|---|---|---|
| 1 | −17.672 | 2.83 | 1.72916 | 54.7 |
| 2 | −89.839 | 2.95–1.00–0.45–0.30 | — | — |
| 3 | 16.827 | 5.15 | 1.48749 | 70.2 |
| 4 | −10.212 | 1.50 | 1.80100 | 35.0 |
| 5 | −59.298 | 0.20 | — | — |
| 6 | 55.254 | 3.10 | 1.72750 | 40.3 |
| 7* | −16.853 | 11.23–4.43–2.78–2.43 | — | — |
| 8* | −85.560 | 2.56 | 1.58547 | 29.9 |
| 9 | −26.514 | 4.70 | — | — |
| 10 | −10.468 | 1.40 | 1.80400 | 46.6 |
| 11 | −158.616 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 7 | 0.00 | 0.7000 × 10$^{-4}$ | −0.2297 × 10$^{-6}$ | 0.2526 × 10$^{-8}$ |
| 8 | 0.00 | 0.6217 × 10$^{-4}$ | −0.3459 × 10$^{-6}$ | 0.8542 × 10$^{-8}$ |

Embodiment 3

FIGS. 13 through 16D show the third embodiment of the present invention. The third embodiment is applied to a zoom lens system having the lens-group moving paths shown in FIG. 19. FIG. 13 is the lens arrangement of the zoom lens system, at the short focal length extremity. FIGS. 14A through 14D show aberrations occurred in the lens arrangement shown in FIG. 13. FIGS. 15A through 15D show aberrations occurred in the lens arrangement shown in FIG. 13, at an intermediate focal length. FIGS. 16A through 16D show aberrations occurred in the lens arrangement shown in FIG. 13, at the long focal length extremity. Table 3 shows the numerical data of the third embodiment. The basic lens arrangement of the third embodiment is the same as the first embodiment. The diaphragm S is provided 1.0 millimeter behind the second lens group 20 (lens surface No. 7).

TABLE 3

$F_{NO}$ = 1:5.6–7.8–7.7–11.1–12.8
f = 28.50–70.00–105.00–118.00
W = 36.9–17.1–11.6–10.4
$f_B$ = 7.98–43.71–72.48–82.85

| Surf. No. | r | d | $N_d$ | ν |
|---|---|---|---|---|
| 1 | −18.100 | 2.87 | 1.71300 | 53.9 |
| 2 | −139.225 | 2.94–1.20–0.50–0.28 | — | — |
| 3 | 16.210 | 5.52 | 1.48749 | 70.2 |
| 4 | −10.967 | 1.50 | 1.80100 | 35.0 |
| 5 | −66.652 | 0.20 | — | — |
| 6 | 46.835 | 2.80 | 1.72750 | 40.3 |
| 7* | −18.187 | 11.79–4.42–2.81–2.49 | — | — |
| 8* | −72.215 | 2.69 | 1.58547 | 29.9 |
| 9* | −24.636 | 4.29 | — | — |
| 10 | −10.816 | 1.40 | 1.80400 | 46.6 |
| 11 | −148.687 | — | — | — |

*designates the aspherical surface which is rotationally symmetrical with respect to the optical axis.

Aspherical surface data (the aspherical surface coefficients not indicated are zero (0.00)):

| Surf.No. | K | A4 | A6 | A8 |
|---|---|---|---|---|
| 7 | 0.00 | $0.7212 \times 10^{-4}$ | $-0.7034 \times 10^{-7}$ | $0.4114 \times 10^{-10}$ |
| 8 | 0.00 | $0.6730 \times 10^{-4}$ | $0.8857 \times 10^{-6}$ | $0.2780 \times 10^{-8}$ |
| 9 | 0.00 | $0.6315 \times 10^{-5}$ | $0.1200 \times 10^{-5}$ | — |

Numerical values of each condition of each embodiment are shown in Table 4.

TABLE 4

|  | Embodiment 1 | Embodiment 2 | Embodiment 3 |
|---|---|---|---|
| Condition (1) | −0.63 | −0.62 | −0.64 |
| Condition (2) | 54.68 | 54.68 | 53.85 |
| Condition (3) | 1.73 | 1.73 | 1.71 |
| Condition (4) | −3.68 | −3.85 | −4.00 |
| Condition (5) | 0.093 | 0.095 | 0.093 |
| Condition (6) | 0.76 | 0.76 | 0.76 |
| Condition (7) | 4.14 | 4.14 | 4.14 |
| Condition (8) | −19.37 | −19.37 | −19.53 |
| Condition (9) | 0.15 | 0.13 | 0.14 |

As can be understood from the Table 4, the numerical values of each embodiment satisfy each condition. Furthermore, as can be understood from the aberration diagrams, the various aberrations are adequately corrected at each focal length.

According to the above description, a miniaturized three-lens-group zoom lens system for a compact camera, which can attain the half angle-of-view of more than 35° at the short focal length extremity, can be obtained.

What is claimed is:

1. A zoom lens system comprising a negative first lens group, a positive second lens group and a negative third lens group in this order from an object, wherein zooming is performed by moving said first through third lens groups in the optical axis direction, wherein said positive second lens group includes a doublet and a positive lens element, in this order from said object.

wherein said negative first lens group consists of a negative single lens element having a concave surface facing toward said object, and wherein said zoom lens system satisfies the following condition:

$-1 < r1/fW < -0.3$ wherein r1 designates the radius of curvature of the object-side concave surface of said negative single lens element: and fW designates the focal length of the entire zoom lens system at the short focal length extremity.

2. The zoom lens system according to claim 1, wherein said negative single lens element having said concave surface facing toward said object comprises a negative meniscus lens element.

3. The zoom lens system according to claim 1, wherein said zoom lens system satisfies the following condition:

$50 < vd$ wherein vd designates the Abbe number of said negative single lens element.

4. The zoom lens system according to claim 1, wherein said zoom lens system satisfies the following condition:

$1.7 < nd$ wherein nd designates the refractive index of the d-line of said negative single lens element.

5. The zoom lens system according to claim 1, wherein said zoom lens system satisfies the following condition:

$-5 < fT/f1G < -3$ wherein fT designates the focal length of the entire zoom lens system at the long focal length extremity; and f1G designates the focal length of said negative single lens element.

6. The zoom lens system according to claim 1, wherein said zoom lens system satisfies the following condition:

$0.05 < (d12W - d12T)/fW < 0.15$ wherein d12W designates the distance between said negative single lens element and said second lens group at the short focal length extremity; and d12T designates the distance between said negative single lens element and said second lens group at the long focal length extremity.

7. The zoom lens system according to claim 1, wherein said zoom lens system satisfies the following condition:

$0.6 < y/fW < 0.9$ wherein y designates the diagonal image height on a film surface.

8. The zoom lens system according to claim 1, wherein said zoom lens system satisfies the following condition:

$3.5 < fT/fW$ wherein fT designates the focal length of the entire zoom lens system at the long focal length extremity; and fW designates the focal length of the entire zoom lens system at the short focal length extremity.

9. The zoom lens system according to claim 1, wherein said positive second lens group comprises a lens element having at least one aspherical surface, and wherein said aspherical surface satisfies the following condition:

$-30 < \Delta 1ASP < -10$ wherein $\Delta 1ASP$ designates the amount of change of the spherical aberration coefficient due to the aspherical surface under the condition that the focal length at the short focal length extremity is converted to 1.0.

10. The zoom lens system according to claim 1, wherein said negative third lens group comprises a lens element having at least one aspherical surface, and wherein said aspherical surface satisfies the following condition:

$0 < \Delta VASP < 0.4$ wherein

ΔVASP designates the amount of change of the distortion coefficient due to the aspherical surface under the condition that the focal length at the short focal length extremity is converted to 1.0.

11. A zoom lens system that focuses on objects at variable distances up to infinity, said zoom lens system comprising a negative first lens group, a positive second lens group, and a negative third lens group, in this order from an object, wherein zooming is performed by moving said first through third lens groups in the optical axis direction, wherein said negative first lens group consists of a negative single lens element having a concave surface facing toward said object, and wherein said zoom lens system satisfies the following condition:

$$-1 < r1/fW < -0.3$$

wherein r1 designates the radius of curvature of the object-side concave surface of said negative single lens element; and fW designates the focal length of the entire zoom lens system at the short focal length extremity.

12. The zoom lens system according to claim 11, wherein said zoom lens system satisfies the following condition:

$$-5 < fT/f1G-3$$

wherein fT designates the focal length of the entire zoom lens system at the long focal length extremity; and f1G designates the focal length of said negative single lens element.

13. The zoom lens system according to claim 11, wherein said zoom lens system satisfies the following condition:

$$0.6 y/fW < 0.9$$

wherein y designates the diagonal image height on a film surface.

14. The zoom lens system according to claim 11, wherein said zoom lens system satisfies the following condition:

$$3.5 < fT/fW$$

wherein fT designates the focal length of the entire zoom lens system at the long focal length extremity; and fW designates the focal length of the entire zoom lens system at the short focal length extremity.

15. A zoom lens system comprising a negative first lens group, a positive second lens group, and a negative third lens group, in this order from an object, wherein zooming is performed by moving said first through third lens groups in the optical axis direction, wherein said negative first lens group consists of a negative single lens element having a concave surface facing toward said object, and wherein said zoom lens system satisfies the following conditions:

$$-1 < r1/fW < -0.3$$

and $$-5 < fT/f1G < -3$$

wherein r1 designates the radius of curvature of the object-side concave surface or said negative single lens element;

fW designates the focal length of the entire zoom lens system at the short focal length extremity;

fT designates the focal length of the entire loom lens system at the long focal length extremity; and f1G designates the focal length of said negative single lens element.

16. The zoom lens system according to claim 15, wherein said negative single lens element having said concave surface facing toward said object comprises a negative meniscus lens element.

17. The zoom lens system according to claim 15, wherein said zoom lens system satisfies the following condition:

$$50 < vd$$

wherein vd designates the Abbe number of said negative single lens element.

18. The zoom lens system according to claim 15, wherein said zoom lens system satisfies the following condition:

$$1.7 < nd$$

wherein nd designates the refractive index of the d-line of said negative single lens element.

19. The zoom lens system according to claim 15, wherein said zoom lens system satisfies the following condition:

$$0.05 < (d12W - d12T)/fW < 0.15$$

wherein d12W designates the distance between said negative single lens element and said second lens group at the short focal length extremity; and d12T designates the distance between said negative single lens element and said second lens group at the long focal length extremity.

20. A zoom lens system comprising a negative first lens group, a positive second lens group, and a negative third lens group, in this order from an object, wherein zooming is performed by moving said first through third lens groups in the optical axis direction.

wherein said negative first lens group consists of a negative single lens element having a concave surface facing toward said object, and wherein said zoom lens system satisfies the following conditions:

$$-1 < r1/fW < -0.3$$

and $$0.6 < y/fW < 0.9$$

wherein r1 designates the radius of curvature of the object-side concave surface of said negative single lens element:

fW designates the focal length of the entire zoom lens system at the short focal length extremity; and y designates the diagonal image height on a film surface.

21. The zoom lens system according to claim 20, wherein said negative single lens element having said concave surface facing toward said object comprises a negative meniscus lens element.

22. The zoom lens system according to claim 20, wherein said zoom lens system satisfies the following condition:

$$50 < \nu d$$

wherein

νd designates the Abbe number of said negative single lens element.

23. The zoom lens system according to claim 20, wherein said zoom lens system satisfies the following condition:

$$1.7 < nd$$

wherein nd designates the refractive index of the d-line of said negative single lens element.

24. The zoom lens system according to claim 20, wherein said zoom lens system satisfies the following condition:

$$0.05 < (d12W - d12T)/fW < 0.15$$

wherein d12W designates the distance between said negative single lens element and said second lens group at the short focal length extremity; and d12T designates the distance between said negative single lens element and said second lens group at the long focal length extremity.

25. A zoom lens system comprising a negative first lens group, a positive second lens group, and a negative third lens group, in this order from an object, wherein zooming is performed by moving said first through third lens groups in the optical axis direction.

wherein said negative first lens group consists of a negative single lens element having a concave surface facing toward said object, and wherein said zoom lens system satisfies the following conditions:

$$-1 < r1/fW < -0.3$$

and $$3.5 < fT/fW$$

wherein r1 designates the radius of curvature of the object-side concave surface of said negative single lens element;

fW designates the focal length of the entire zoom lens system at the short focal length extremity; and fT designates the focal length of the entire zoom lens system at the long focal length extremity.

26. The zoom lens system according to claim 25, wherein said negative single lens element having said concave surface facing toward said object comprises a negative meniscus lens element.

27. The zoom lens system according to claim 25, wherein said zoom lens system satisfies the following condition:

$$50 < \nu d$$

wherein

νd designates the Abbe number of said negative single lens element.

28. The zoom lens system according to claim 25, wherein said zoom lens system satisfies the following condition:

$$1.7 < nd$$

wherein nd designates the refractive index of the d-line of said negative single lens element.

29. The zoom lens system according to claim 25, wherein said zoom lens system satisfies the following condition:

$$0.05 < (d12W - d12T)/fW < 0.15$$

wherein d12W designates the distance between said negative single lens element and said second lens group at the short focal length extremity; and d12T designates the distance between said negative single lens element and said second lens group at the long focal length extremity.

* * * * *